Oct. 18, 1960  S. M. SILVER  2,956,712
ONE-PIECE METERED DISPENSING CARTON OR THE LIKE
Filed Jan. 22, 1957  4 Sheets-Sheet 4
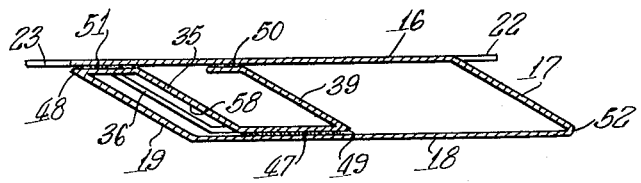
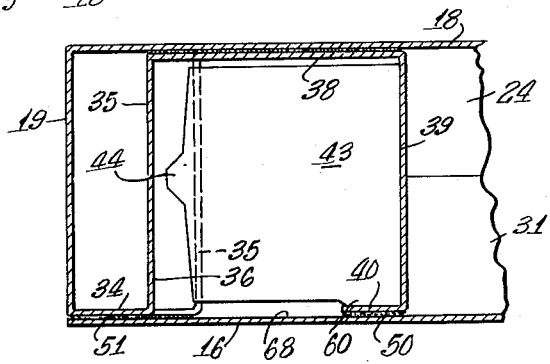
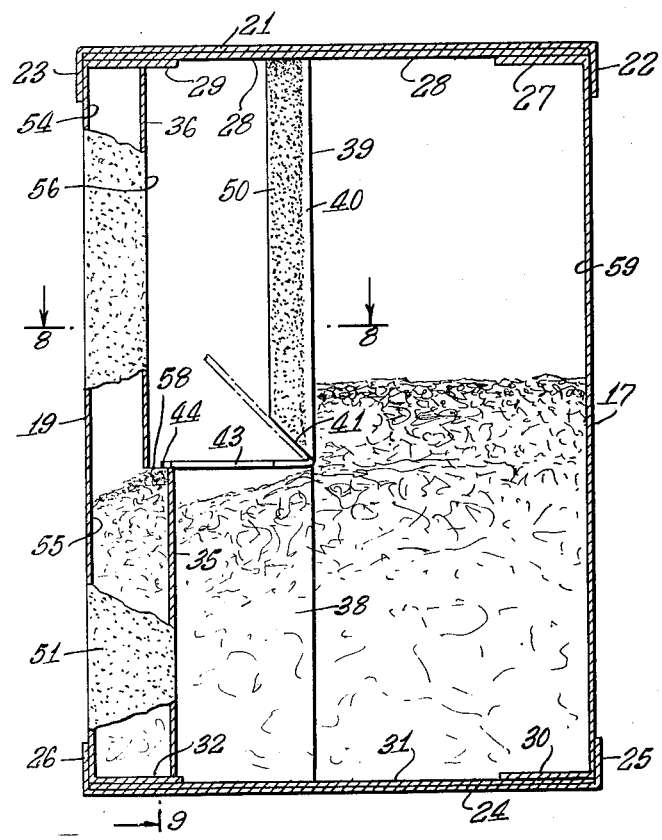
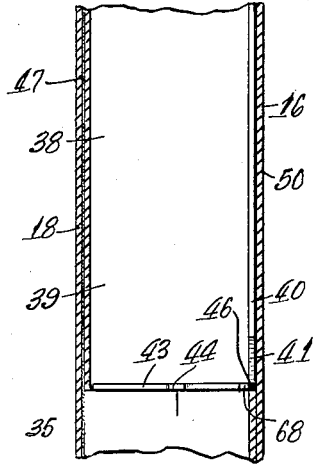
INVENTOR.
STAN M. SILVER
BY
ATTORNEY – # United States Patent Office 2,956,712
Patented Oct. 18, 1960

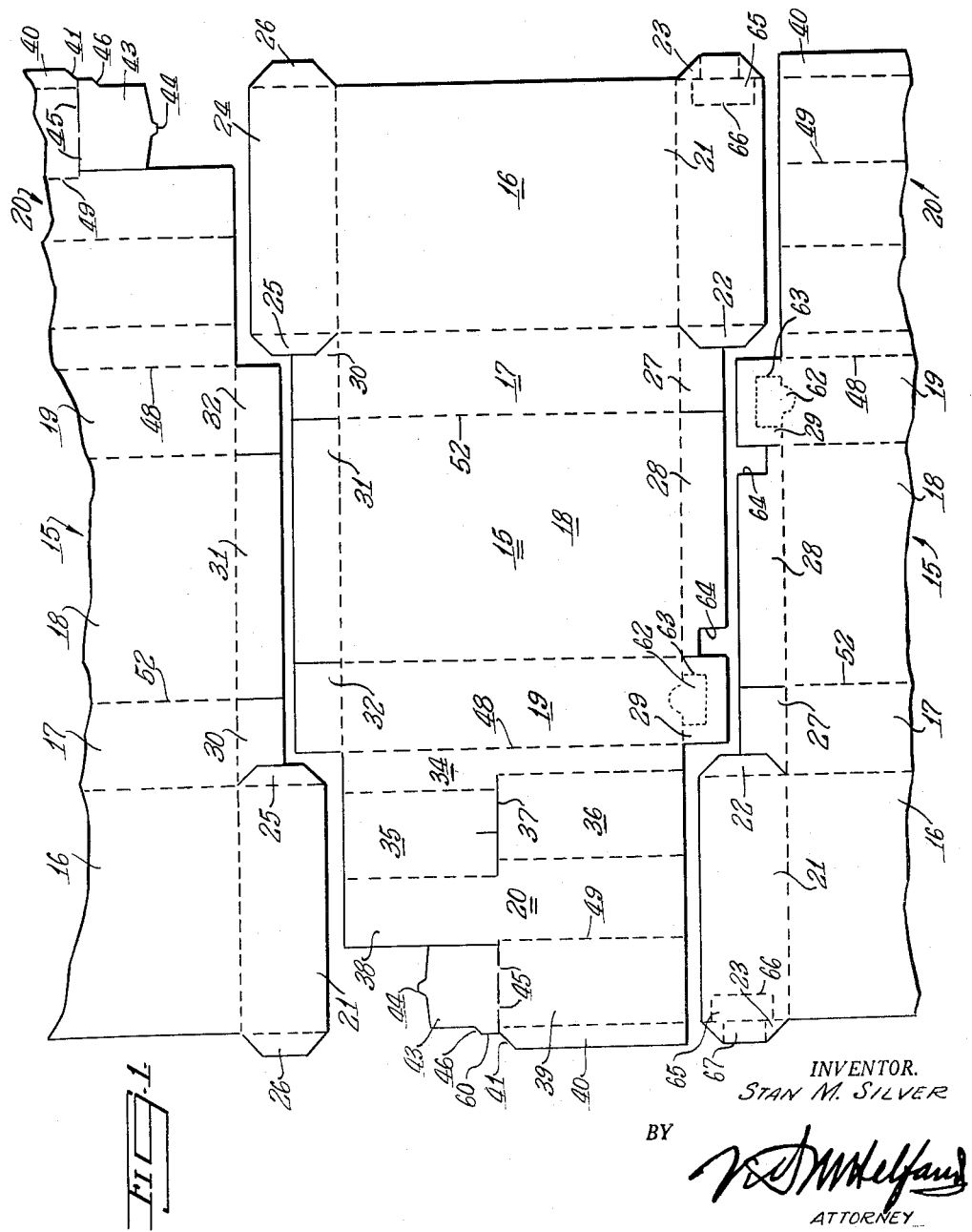

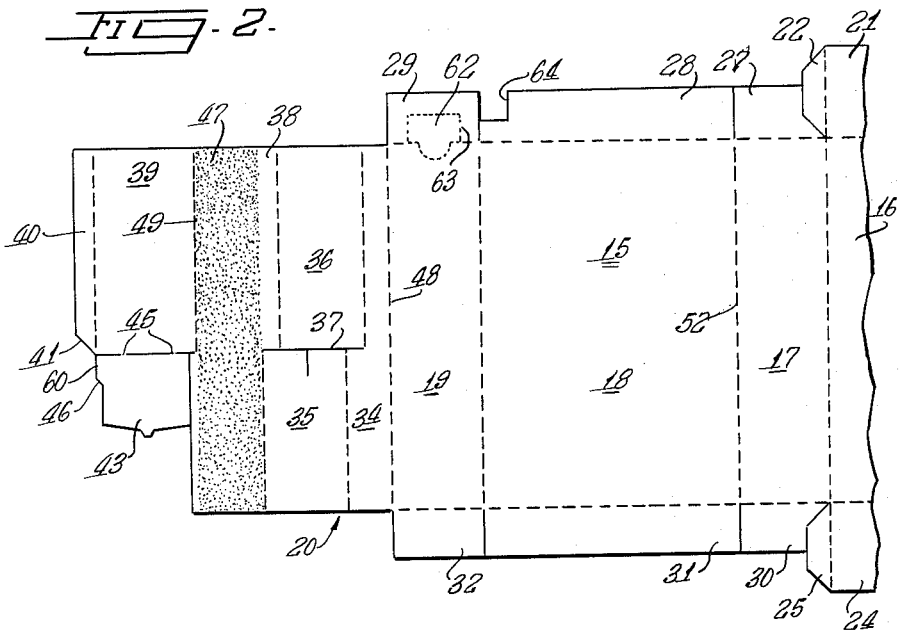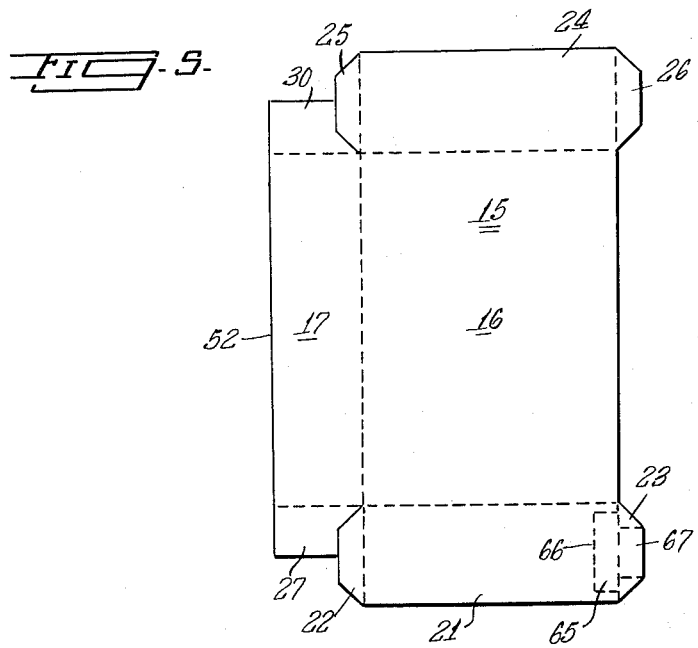

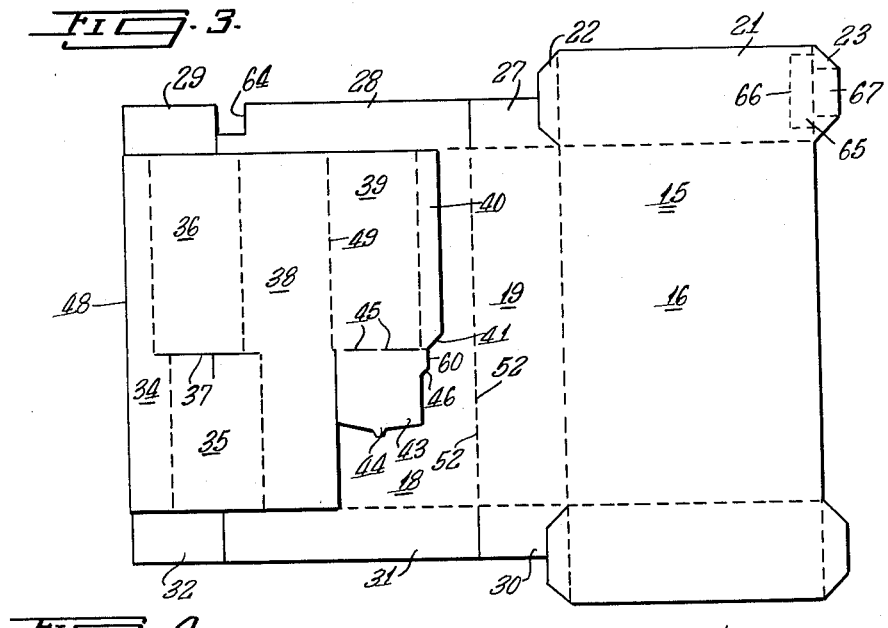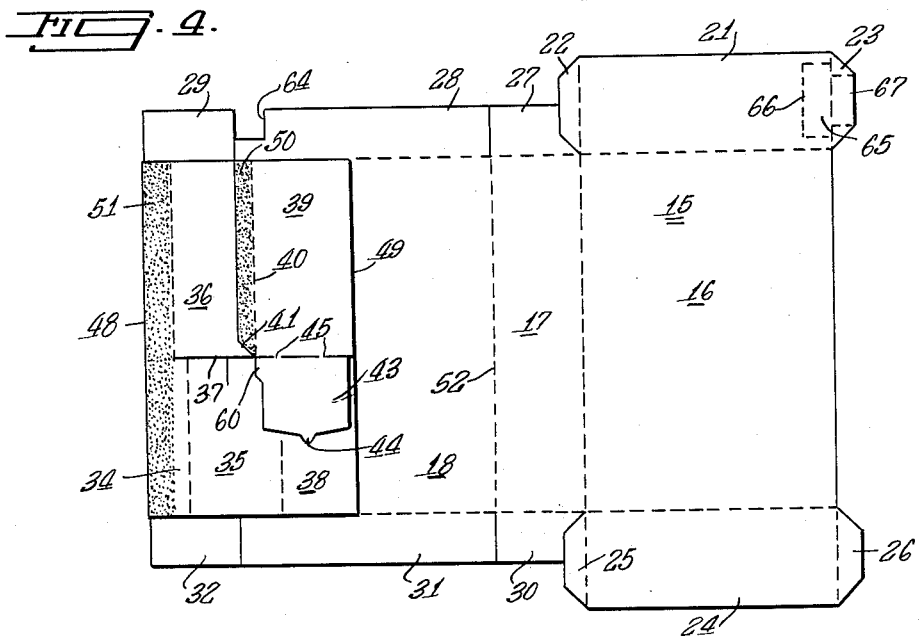

2,956,712

ONE-PIECE METERED DISPENSING CARTON OR THE LIKE

Stan M. Silver, New York, N.Y., assignor to Victor M. Helfand, New York, N.Y.

Filed Jan. 22, 1957, Ser. No. 635,413

11 Claims. (Cl. 222—455)

The present invention relates to a metered dispensing carton, or like container, and is an extension and improvement of the invention described and claimed in my copending application, Serial No. 597,249, filed July 11, 1956, now matured in U.S. Letters Patent No. 2,801,033, dated July 30, 1957, reissued September 15, 1959 as No. Re. 24,699.

In my said copending application I have described and claimed a metered dispensing carton which is divided by a separate partition member that is fitted and secured therewithin into four compartments; namely, an open top metering chamber, along a lower portion of an end wall of the carton; a chute of lesser capacity than the metering chamber directly above the metering chamber, along the same end wall and continuous with a portion of the thickness of the metering chamber; a supply chamber of greater capacity than the metering chamber alongside of the chute and overlying the other, inner portion of the thickness of the metering chamber and communicating therewith through a common opening in the overlying portion. The supply chamber is provided with a struck out valve tongue or trap in its bottom wall which is movable only in an inward direction into the supply chamber and provides an opening through which material is fed into the supply chamber from the fourth or storage compartment of the carton. In said copending application I have also described how a carton so constructed is capable of dispensing evenly metered amounts of material, from first to last.

The present invention is directed to the provision of a metered dispensing carton of the same general character which is a variant and improvement of the metered dispensing carton of my said copending application, broadly described above. It is the general object of the present invention to provide such metered dispensing carton or like container which, while generally functioning in the same manner as my said earlier carton, and of generally similar construction, presents certain advantages over my said earlier carton in construction, function, setting up and assembly.

It is, thus, one object of the present invention to provide a metered dispensing carton or like container, of the character described, in which the several compartments are formed by partition means that is not separate from but is integral with the carton walls, to thereby eliminate the need for the fitting and gluing in of a separate partition, for the mechanism of effecting such fitting and gluing and the separate operation for accomplishing it, and make the assembly and setting up of the carton simpler and more economical.

It is also an object of the present invention to provide a one-piece metered dispensing carton that may be folded and glued on any conventional straight line gluing apparatus.

It is also another object of the present invention to provide a one-piece metered dispensing carton or like container in which the partitioning portions are secured to the side walls of the carton, with the grain of the cardboard from which they are formed running along their width, in such position and manner that they serve to reinforce the carton, longitudinally, both, against bulging under the weight of its contents as well as against crushing, and make possible the use of thinner gauge cardboard in their making so as to render such cartons no costlier than similar, non-metering, conventional cartons.

It is still another object of the present invention to provide metered dispensing cartons of the character described formed from one piece blanks that may be cut from a continuous strip of cardboard in nested relation, with a minimum of waste, and which are formed without inner cut-outs that require striking out, to thereby enhance the ease and economy of production and setting up.

It is a further object of the present invention to provide metered dispensing cartons of the character described in which the inward movement of the valve between supply chamber and storage compartment into the supply chamber is limited, to prevent its deactivation through overpivoting or overbalancing, and thereby assure the effective and continuous metering operation of the carton until it is completely exhausted.

It is a still further object of the present invention to provide metered dispensing cartons of the character described in which the backflow from the metering chamber into the supply chamber and from the supply chamber into the storage compartment, for the purpose of emptying the chute of any material that may have been disposed therein, so as to assure an accurately metered first dispensing, is more effectively provided for and assured.

The foregoing and other objects and advantages of the metered dispensing container or carton of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a plan view showing a group of contiguous, nested blanks for forming the carton of the present invention, die-cut from a continuous strip of cardboard in nested relation, with the end blanks shown in fragmentary form;

Fig. 2 is a fragmentary plan view of one of the blanks of Fig. 1, shown in a first step of folding and gluing;

Fig. 3 is a plan view of the blank of Fig. 2, shown at a second step of folding and gluing;

Fig. 4 is a plan view of the blank of Fig. 2, shown in a third step of folding and gluing into a carton;

Fig. 5 is a plan view of the carton blank of Fig. 2, shown in a further stage of folding and gluing into a carton;

Fig. 6 is an end view of the folded and glued blank of Fig. 5, shown partly unfolded;

Fig. 7 is an elevation of a carton fully unfolded and set up from the blank of Fig. 2, shown as filled, and with one side wall removed, to illustrate structural detail and function;

Fig. 8 is a section taken on line 8—8 of Fig. 7; and

Fig. 9 is a section taken on line 9—9 of Fig. 7.

Referring, now, in greater detail to the illustrative embodiment of the metered dispensing carton shown in the accompanying drawing, the same comprises a cardboard blank, generally designated as 15, preferably cut along the length of a strip of cardboard of the type generally used for the purpose, so that the grain of the cardboard runs with the width of the blank 15. The blank 15 is cut and scored to provide the four walls generally required for a carton, including an outer side wall, 16, an inner end wall section, 17, an inner side wall section, 18, and an outer end wall section, 19. The blank 15 is also provided with an integral, infolding extension, 20, on the outer edge of the outer end wall section, 19, which constitutes the partitioning means of the carton.

The outer side wall section 16 is formed with a top wall forming flap or extension, 21, of a height equal to the projected width of the carton and having, at its opposed ends, inner and outer gluing ears, 22 and 23, respectively. The outer side wall section 16 is also provided with an integral bottom wall forming flap or extension, 24, also of a height equal to the projected width of the carton and also having at its inner and outer opposed ends the respective gluing ears, 25 and 26. The end wall section, 17, inner side wall section 18 and outer end wall section 19 are each provided with a top wall forming flap, 27, 28 and 29, respectively, each of a height equal to half the projected width of the carton or half the height of the flap 21. Similarly, these wall sections are provided at their lower edges with integral bottom wall forming flaps, 30, 31 and 32, respectively, each likewise of a height equal to half the projected width of the carton or half the height of the adjacent bottom flap 24. The several foregoing wall sections, flaps and gluing ears are defined from one another by scored or similar fold lines, in the conventional manner, and the gluing ears, 22 and 25, are formed, in part, from part of their respective adjacent flaps, 27 and 30.

The infolding extension 20, which is coextensive in height with the adjacent side and end walls 16—19, is formed without any flaps, either at top or bottom, and is substantially equal in width to the width of the flaps 21 and 24 of side wall 16, including their inner and outer gluing ears, so that the blanks 15 may be die cut from a continuous length of cardboard in nested relation, with the side wall 16 of one blank alined with the extension 20 of the adjacent blank; alternate die cuts forming the bottom edges and the top edges, respectively, of adjacent pairs of blanks 15, as clearly shown in Fig. 1 of the drawings, with a minimum waste of material.

The partition forming extension 20 of the carton blank 15 is divided, by suitable, vertically extending, scored fold lines, into a gluing strip, 34, immediately adjacent the outer end wall 19 and having a wider lower portion; a lower panel, 35, equal in width to the projected width of the carton, immediately adjacent the wider, lower portion of the gluing strip 34; an upper panel, 36, of the same width as panel 35, immediately adjacent to the narrower, upper part of the gluing strip 34, so that it is offset inwardly relative to the lower panel 35; the panels 35 and 36 being separated from one another by a cut line, 37, extending their combined widths. The section 20 is further provided, alongside of panels 35 and 36, with a second gluing strip, 38, of substantial width and with a wider upper portion alongside of panel 36 and with a narrower lower portion alongside of panel 35; and, alongside of the wider, upper portion of the gluing strip 38, with a panel, 39, of the height and width of panel 36 and provided with a gluing tab, 40, having a tapered bottom edge, 41, along its outer edge, and a dependent tongue, 43, of equal width, at its lower edge.

The tongue 43 is of a length equal to the width of the narrower, lower portion of gluing strip 38, and is provided at its bottom edge with a projection, 44, for a purpose that will hereafter be made clear. The tongue 43 is preferably laterally outwardly offset relative to panel 39 a distance equal approximately to the thickness of the cardboard from which the blank is formed, and is cut away from panel 39, except for a few, spaced, narrow spots, 45, forming hinges along which the tongue 43 may be bent relative to panel 39. The tongue 43 may, preferably, have a portion of one of its vertical edges, preferably the lower portion of its outer edge, cut away, as at 46, for a purpose which will also hereafter be made clear.

The blank 15, which is generally formed of cardboard that has a calendered surface on one side that constitutes the exterior of the carton, may be folded and glued and set up into a carton, as follows:

A linear coating of adhesive or glue, 47, is first applied to the rougher, inner surface of the gluing strip 38 of the blank 15. The blank is then folded over on itself, along the fold line, 48, between the outer end wall 19 and the infolding extension 20, so that the strip 38 is adhesively secured to the inner side wall section 18. The outer portion of the infolding extension 20 is thereafter folded back on itself, along the fold line, 49, between panel 39 and gluing strip 38, and linear coatings of adhesive applied to the inner rough face of the gluing tab 40 and to the outer, smooth face of the gluing strip 34, as shown at 50 and 51, respectively, in Fig. 4. The blank is then folded over on itself, along fold line, 52, between the inner side wall section 18 and the inner end wall section 17, so that side wall section 16 is adhesively secured by its edge portion to the tab 40, to form a tubular flat folded structure, and gluing strips 34 and 38 are secured to opposed side wall sections 18 and 16, respectively, as will be clearly seen from Fig. 6, wherein the glued, flat, semi-assembled carton is shown partly opened and set up into partly rectangular form.

As the folded and glued blank 15 is moved, by pressing its opposed edges toward one another, into rectangular form, the panels 35, 36 and 39, of the extension 20 are moved into parallel, spaced position relative to the adjoining end wall 19 and to one another; the lower panel 35 being offset further away from end wall 19 relative to the upper panel 36, by reason of their being offset scored relative to one another and of the greater width of the lower portion of the gluing strip 34. The upper panel, 36, defines, with end wall 19, an open bottom chute, 54, and the lower panel 35 defines, with end wall 19, an open top metering chamber, 55, which is of greater capacity than the chute 54, by reason of its greater thickness or depth inwardly, and is continuous along a part of such thickness with the chute 54. The panel 39 is disposed inwardly of the panel 36 and parallel thereto and defines, with panel 36, a supply chamber, 56, the inner wall of which is formed thereby; its bottom wall being formed by the tongue 43, as will hereafter be explained. The supply chamber 56 is of greater capacity than the metering chamber 55, by reason of the greater width of gluing strip 38 over gluing strip 34, and part thereof overlies the inner portion of the metering chamber 55 and is in communication therewith through the open top of the latter, which forms the communicating opening, 58, resulting from the relative offsetting of the panels 35 and 36, along the cut line 37. The remainder of the carton interior constitutes a reserve or storage compartment, 59.

After the glued blank 15 is set up into rectangular form, as described above, the top wall of the carton is closed and sealed by first infolding the top flaps 27 and 29; thereafter infolding the top flap 28 and gluing it to flaps 27 and 29; and finally infolding the top flap 21 and gluing it over flap 28 and the exposed portions of flaps 27 and 29; and thereafter gluing ears 22 and 23 to the contiguous end walls, 17 and 19, respectively.

After the top wall of the carton is sealed, the carton is inverted and the tongue 43 is depressed into horizontal position, preferably by suitable mechanism, as the inverted carton is moved by a conveyor to a filling station, until the projection 44 thereof passes the upper edge of panel 35 and is caught thereagainst, thereby forming a combined bottom wall for the portion of the supply chamber that lies inwardly of the metering chamber, and a one way valve or trap from the storage compartment 59 into the supply chamber 55. In this position, the carton is filled, through its open bottom; with all of its four compartments being filled; the supply chamber 55 being filled through its valve bottom, as the tongue 43 is depressed and bent inwardly thereinto by the weight of material entering the carton. It may here be explained that, as the tongue 43 is bent inwardly into the supply chamber 55, on the hinges 45, by the weight of material descending upon it, its inward movement will be limited by the engagement of its outer edge portion, 60, against the adjacent tapered bottom edge 41 of the gluing tab 40, in the direction of which the tongue 43 is slightly offset, as described above. Thus, the tongue 43 may never become overbalanced and remains in a diagonal position in which it is always capable of receiving the weight of material from the interior of the supply chamber 56 and moved thereby into closed position, whenever the carton is uprighted.

After the carton is thus filled, the bottom wall thereof is sealed by the infolding and gluing together of the bottom wall flaps 30, 32, 31 and 24, and ears 25 and 26, preferably in the order given, and in the same manner as the top wall flaps.

Outlet means are provided in the carton, preferably in the top wall end immediately above the chute 54. Such outlet means may be defined by a knockout piece, 62, formed in the top end flap 29 of the end wall 19, which may be formed with an integral tab extending into such end wall, and is suitably detachably formed by an intermittent cut line, 63, in the conventional manner. In order to fully expose the knockout piece 62, for tearing away, the registering corner of the overlying flap 28 is cut away, as at 64. A tear away tongue, 65, is provided in the overlying outer top wall flap, 21, immediately above the knockout piece 62, defined at its inner end by a scored fold line, 66, and having an integrally connected extension, 67, into and across the gluing ear 23. Such tongue and extension, 65 and 67, are left unglued to their underlying carton wall portions and are pulled upwardly to tear them away from adjacent glued down carton wall portions, to expose the knockout piece 62, which is then torn away to provide the requisite outlet opening.

The operation of the metering structure of the carton will now be explained, particularly the features thereof which provide for backflow of material from the filled chute, which permits the exact, accurate metering, even at the first dispensing, in spite of the fact that the chute is filled during the initial filling of the carton.

In obtaining the foregoing backflow effect, advantage is taken of the fact that it is general usage not to fill cartons of the type to which this invention relates to full capacity; but, generally, only to about 90% of capacity. Consequently, when the filled and sealed inverted carton is uprighted, the material therewithin drops to the carton bottom, generally leaving a small, triangular empty space under the supply chamber 56, as shown in Fig. 7, for the reason that the material cannot flow directly sideways from alongside of the supply chamber to fill the space thereunder that is left by the dropping of the material. This empty space, on the initial uprighting, may be, at most, only partly filled from the supply chamber 56, as the tongue drops into position. This leaves a space in the supply chamber 56 which, on the next inversion of the carton, is filled, at least in part, from the metering chamber 55, leaving a space in the latter. This space in the metering chamber is, on the succeeding uprighting of the carton, at least partly filled from the chute 54, thereby partly emptying the latter.

While, as stated in said copending application, with respect to the carton therein described and claimed, complete depletion of material from the chute may be effected by repeated uprighting and inversion of the carton, such uprighting and inversion, to be effective for the purpose, required relatively strong and vigorous agitation or shaking. In the carton of the present invention, however, the need for such shaking and agitation has been eliminated and the back flow of material from the chute 54 to the storage compartment 59, by the steps described above, made possible merely by the routine inversion and uprighting of the carton such as is incidental upon the handling and transportation thereof from the place of filling to the hands of the consumer. This elimination of shaking and agitation has been made possible by providing positive means for the slow bleeding or leakage of material from the supply chamber 56 to the empty space below it in the storage compartment 59, upon the upright movement of the carton.

This bleeding or leakage is accomplished, in the illustrative embodiment of the invention, by the cutting away of a portion of the outer edge of the tongue 43, as shown at 46, to leave an opening 68, between the tongue and adjacent carton wall portion, from the supply chamber to the storage compartment. Such opening 68 is preferably made sufficiently large to permit the dripping of material therethrough under the force of the normal uprighting and inversion movements to which the carton is generally subjected, and sufficiently small to inhibit such movement of material therethrough when the carton is at rest. It will be readily understood, of course, that the size of such opening 68 will vary with the cartons for materials of different granular size.

Thus, every time the carton is inverted and uprighted, after the initial filling, a small amount of material from the supply chamber 56 will drop through the opening 68 into the storage compartment 59, leaving a space therein which will be filled partly from the metering chamber upon the next inversion and will be replaced in the metering chamber, upon the next uprighting of the carton, partly from the chute, until the chute is completely emptied. Thus, by the time the carton reaches the consumer to make the first dispensing, only material from the metering chamber will be available for dispensing. After the chute 54 is thus emptied, any backflow from the metering chamber will be wholly replaced from the supply chamber, and the metering chamber will always remain full, as long as material remains in the carton, to assure accurate and uniform metering at each dispensing.

The metered dispensing operation of the carton of the present invention is, in all other respects, substantially identical with the operation of the carton of said copending application. As the inversion of the carton for dispensing is begun, the opening 58 between supply chamber 56 and metering chamber 55 is filled and blocked by the carton contents against any interchange of material between the two chambers. This continues to be the situation until the carton reaches the horizontal position. Thereafter, interchange of material between the two chambers is inhibited by gravity. In the last part of the dispensing inversion movement, of course, the supply chamber 56 is replenished through its bottom which is opened by the pressure of the material upon the tongue 43, causing it to move inwardly into the supply chamber. Upon completion of the dispensing movement, the carton is again uprighted. This closes the bottom trap of the supply chamber and the filling of the metering chamber therefrom through the opening 58, in readiness for a new, full and accurate metered dispensing. This operation may be repeated, with comparable results, until the carton is completely emptied.

This completes the description of the metered dispensing carton of the present invention and the method of its operation. It will be apparent that such carton, by reason of its one piece construction which reinforces itself, may be simply and economically produced and set up and that its gluing and assembly may be carried out on any conventional mechanism used for similar non-metering cartons. It will also be apparent that such construction provides a carton that is more certain and more effective in providing for the uniform and accurate dispensing of its contents, from first to last. It will likewise be apparent that such carton is simple and easy to use and requires no skill or training or any extra or unusual effort on the part of the consumer for its efficient use.

It will be further apparent that numerous modifications and variations may be made in the cartons of the present invention, in accordance with the principles of the invention hereinabove set forth, without the exercise of any inventive ingenuity. I desire, therefore, to be protected for any and all such modifications and variations that may be made within the spirit of the present invention and the scope of the claims hereto appended.

What I claim is:

1. A blank for a metered dispensing carton, comprising a cardboard strip cut and scored to define at least four contiguous upright wall sections foldable to define a tubular body, an end one of said wall sections having an upright lateral extension, said extension scored and cut to be inwardly foldable into said tubular body and to define therewithin a plurality of compartments, and including a first gluing strip alongside said one end wall section, an upper panel portion and a lower panel portion alongside of said first gluing strip, said panel portions of equal width with said one end wall section, a slit formed in said extension defining an opening dividing said panels from one another, a second gluing strip alongside said panels, a third panel substantially the width of said first panel alongside said second gluing strip opposite said first panel, a gluing tab alongside said third panel and a hinged tongue at the lower edge of said third panel foldable to have an end portion thereof engage over the lower edge of said slit when said blank is folded and set up.

2. The blank of claim 1, wherein said cardboard strip is formed with a calendered side forming the exterior of the carton, said extension scored to have the calendered side of said hinged tongue face said upper and lower panels when said blank is folded into a carton.

3. The blank of claim 1, wherein each of said upright wall sections is formed with a flap at its upper and lower edges, said flaps foldable toward one another when said blank is folded into a tubular body to form the top and bottom walls thereof, the flaps of the other end one of said wall sections being each of an overall height equal substantially to the width of said one end of said wall sections and the flaps of said other wall sections each being of an overall height not exceeding half the height of said flaps of said other end wall section.

4. The blank of claim 1, wherein said hinged tongue is the width of said third panel and has a portion of a side edge thereof cut away, to define a narrow opening between said tongue edge and the adjacent wall section when said blank and said tongue are folded and set up into a carton.

5. The blank of claim 1, wherein each of said upright wall sections is formed with a flap at its upper and at its lower edge, said flaps foldable toward one another when said blank is folded into a tubular body to form top and bottom walls therefor, the flaps of the other end one of said wall sections each being of a height equal substantially to the width of the first named of said end wall sections, the flaps of the other of said wall sections each being of a height substantially less than the height of said flaps of said other end one of said wall sections.

6. The blank of claim 1, wherein the portion of said first gluing strip alongside said lower panel is of greater width than the upper portion thereof thereby offsetting said lower panel laterally relative to said upper panel, and the upper portion of said second gluing strip overlaps said lower panel and the slit dividing said upper and lower panels from one another extends their combined widths.

7. A metered dispensing carton, comprising a tubular receptacle having top and bottom walls and connecting upright walls and partition means integral with an upright edge of one of said upright walls, said partition means extending inwardly into said tubular receptacle and defining therein a plurality of compartments, including an open top metering chamber along the lower portion of said one wall, a chute along the upper portion of said one wall immediately above said metering chamber and continuous therewith, and a supply chamber alongside of said chute and inwardly thereof, said supply chamber communicating with the upper end of said metering chamber, said supply chamber including a hingedly connected, inwardly foldable bottom wall extending from an edge of a wall of said supply chamber, said bottom wall being of a width substantially equal to the width of said one upright wall and freely movable within said receptacle and having an edge portion thereof resting upon an edge portion of said metering chamber.

8. The dispensing carton of claim 7, wherein said hinged bottom wall has a portion thereof cut away to provide a narrow opening between said supply chamber and said receptacle interior therebelow, for limited movement of material between them.

9. The metered dispensing carton of claim 7, wherein means are provided within said supply chamber, integral with said partition means, limiting the inward movement of said bottom wall thereof thereinto.

10. A metered dispensing carton, comprising a tubular receptacle having top and bottom walls and pairs of opposed, connecting upright walls and partition means at an upright edge of one of said walls, said partition means extending inwardly into said tubular receptacle and defining therewithin a plurality of compartments, including a metering chamber along the lower portion of said one wall, said metering chamber having an opening provided at its upper end, a chute along the upper portion of said one wall, immediately above and opening into the top of said metering chamber, and a supply chamber communicating with the opening of said metering chamber, said partition means including parts forming side wall portions for said supply chamber parallel to and engaging against opposed upright walls of said receptacle connected to each side of said one upright wall thereof, said supply chamber including a bottom wall hingedly connected to the bottom edge of a wall thereof by one edge and having the portion of another edge thereof resting upon the upper edge portion of a wall defining the opening of said metering chamber.

11. The metered dispensing carton of claim 10, wherein said side wall portions of said supply chamber are secured to said opposed upright walls to each side of said one wall.

References Cited in the file of this patent

UNITED STATES PATENTS

| | | |
|---|---|---|
| 2,801,033 | Silver | July 30, 1957 |
| 2,801,034 | Silver | July 30, 1957 |
| 2,803,385 | Silver et al. | Aug. 20, 1957 |